United States Patent [19]

Slosiarek et al.

[11] Patent Number: 4,648,311
[45] Date of Patent: Mar. 10, 1987

[54] DOWNWARDLY SWINGING REPLACEABLE AIR FILTER FOR A VEHICLE CAB

[75] Inventors: Michael L. Slosiarek, Rome, Ga.; Robert J. Wagner, Milwaukee, Wis.

[73] Assignee: Deutz-Allis Corporation, Milwaukee, Wis.

[21] Appl. No.: 443,749

[22] Filed: Nov. 22, 1982

Related U.S. Application Data

[63] Continuation of Ser. No. 214,271, Dec. 8, 1980, abandoned.

[51] Int. Cl.⁴ .............................................. B60H 3/06
[52] U.S. Cl. ..................................................... 98/2.11
[58] Field of Search .................... 55/385 B, 422, 480, 55/493, 494, 502, 505, 506, 515; 98/2.11, 40 DL

[56] References Cited

U.S. PATENT DOCUMENTS

| 3,308,288 | 3/1967 | Ades | 98/40 DL X |
| 3,570,220 | 3/1971 | Felter | 55/493 X |
| 3,868,896 | 3/1975 | Doll et al. | 98/2.11 |
| 4,217,121 | 8/1980 | Fichter | 55/493 X |

Primary Examiner—Harold Joyce
Attorney, Agent, or Firm—Charles L. Schwab

[57] ABSTRACT

A downwardly swinging air filter from the roof overhang of a vehicle cab to allow replacement of the air filter. The filter is carried in the tray pivotally supported and latched in an operating position which seals the filter on the inlet and outlet surfaces.

10 Claims, 8 Drawing Figures

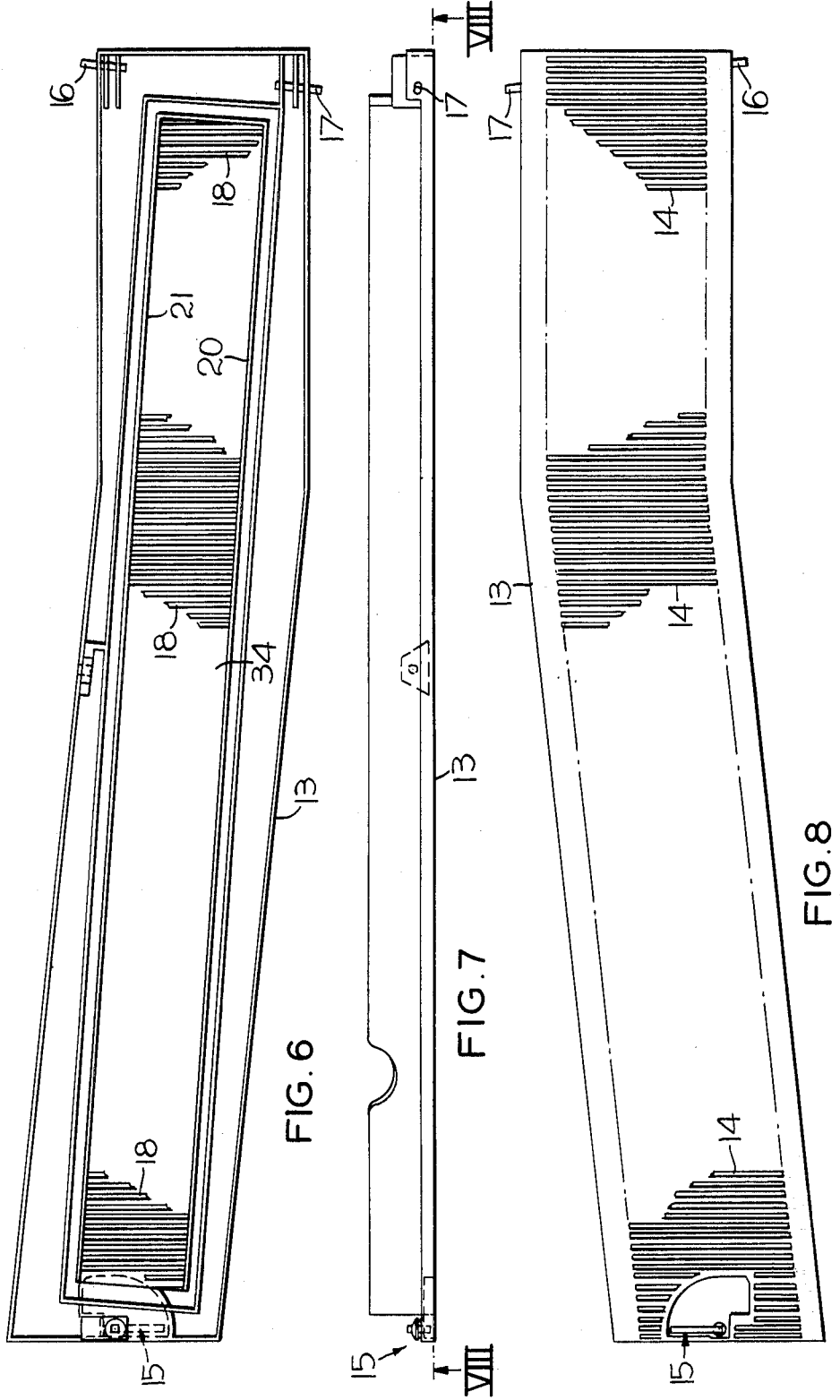

DOWNWARDLY SWINGING REPLACEABLE AIR FILTER FOR A VEHICLE CAB

This is a continuation, of application Ser. No. 214,271, filed Dec. 8, 1980 now abandoned.

This invention relates to an air filter and more particularly to an air filter on a vehicle cab mounted on the underside of the roof extension. The filter is pivotally supported and latched in a filter tray to allow replacement by downwardly swinging the filter and tray. The position of the filter allows servicing of the filter from outside of the cab and permits the complete removal of the filter assembly when servicing.

Normally cleaning of the filter inside the cab is inconvenient and removal of the filter element usually loosens considerable dirt which has accumulated and which produces an undesirable situation. This tends to delay servicing of the filter since the dirt and inconvenience is avoided. The mounting of the filter on the outside of the cab provides a convenient and easy way for servicing the filter and maintains the interior of the cab in a clean operating condition. Filter servicing can be accomplished in much less time without requiring a vacuum or some other means to clean the interior of the cab once the filter servicing has been accomplished.

U.S. Pat. No. 4,002,443, Lorenz, shows a filter for a vehicle cab and a servicing arrangement. Essentially, the patent shows a camming device for placing the filter into a sealing position in the cab.

The Bowman et al patent, U.S. Pat. No. 4,140,047, shows an externally mounted filter in the roof overhang on the front of the cab. The filter element must be extracted from a small door on the side of the cab in order to service the filter but the dirt in the compartment is not easily removed from the assembly.

The applicants' invention has provided for mounting of the filter on the underside of the roof extension on the side of the vehicle. Positioning of the filter elements on the side of the vehicle provides for convenient servicing which can be accomplished from standing on the ground alongside the tractor. The filter tray and filter when unlatched swing downwardly permitting the removal of the filter and allowing dirt and dust to fall away from the filter compartment and providing a relatively clean job. If need be, the filter tray can also be detached and removed and the whole compartment cleaned with a minimum of trouble since the dirt falls away leaving the compartment in a clean condition. A new filter element can be readily inserted in the tray and pivoted upward and latched and the filtering system is again ready for operation.

It is an object of this invention to provide an air filter on the side of the cab for convenient replacement of the filter element.

It is another object of this invention to provide an air filter mounted on the sun shade on the side of the vehicle formed by the roof overhang whereby the filter element swings downwardly when servicing allowing the dirt to fall away from the filter compartment.

It is a further object of this invention to provide a cab filter which swings down from the roof overhang to allow replacement of the filter element in the filter tray and returning the tray and filter in the system by swinging the filter tray upwardly and latching in the operating position.

It is another object of this invention to provide a sun shade formed by the roof overhang on the side of the vehicle which forms an inlet passage and a filter chamber. The filter tray and filter can be pivoted downwardly and away from the roof overhang allowing dirt to fall away from the compartment and leaving the system in a clean operating condition when a new filter is inserted and latched in place.

The objects of this invention are accomplished in a vehicle cab having side sun shades formed by the roof overhang. The roof overhang forms a fresh air inlet which is covered by the filter element on the underside of the roof overhang for the length of the cab. The filter is sealed on its underside by the filter tray and sealed with the inlet passage on its upper side when the tray is latched in the operating position. A filter tray is pivotally mounted in the roof overhang and can be easily removed completely from the roof overhang if the filter compartment needs cleaning. The filter tray and filter can easily be installed and repositioned in the operating position once the servicing is completed.

Referring to the drawings, the preferred embodiment of this invention is illustrated.

FIG. 6 is a plan view of the filter tray.

FIG. 7 is a side elevation view of FIG. 6.

FIG. 8 is a view taken on line VIII—VIII of FIG. 7 showing the underside of the filter tray.

Figure 1:
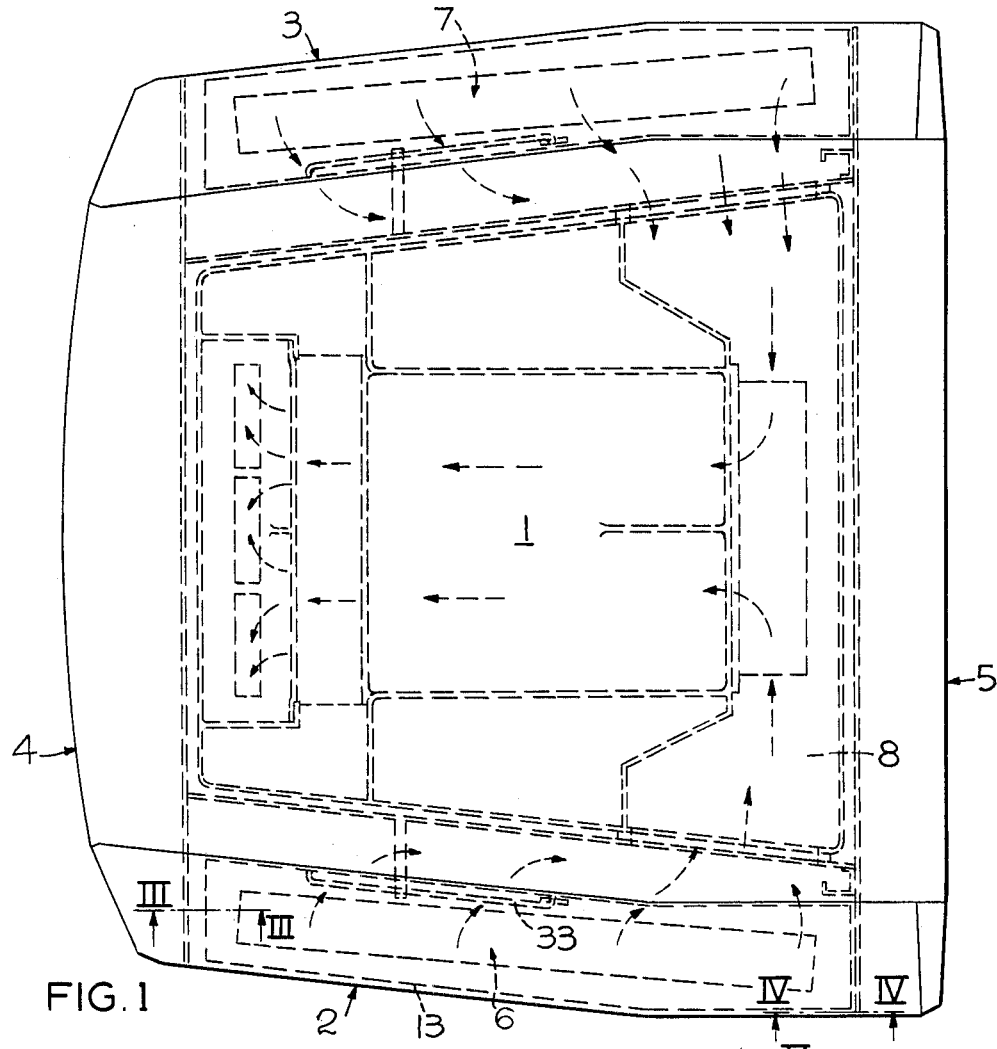
FIG. 1 is a plan view of the roof of the cab showing the related positions of the filter elements in the roof overhang.

Referring to the drawings, the cab 1 includes a roof overhang 2 on the left-hand side of the vehicle and a roof overhang 3 on the right-hand side of the vehicle providing a sun shade on both sides of the vehicle. Sun shade 4 is also provided on the front of the vehicle and a shade 5 on the rear of the vehicle.

Figure 5:
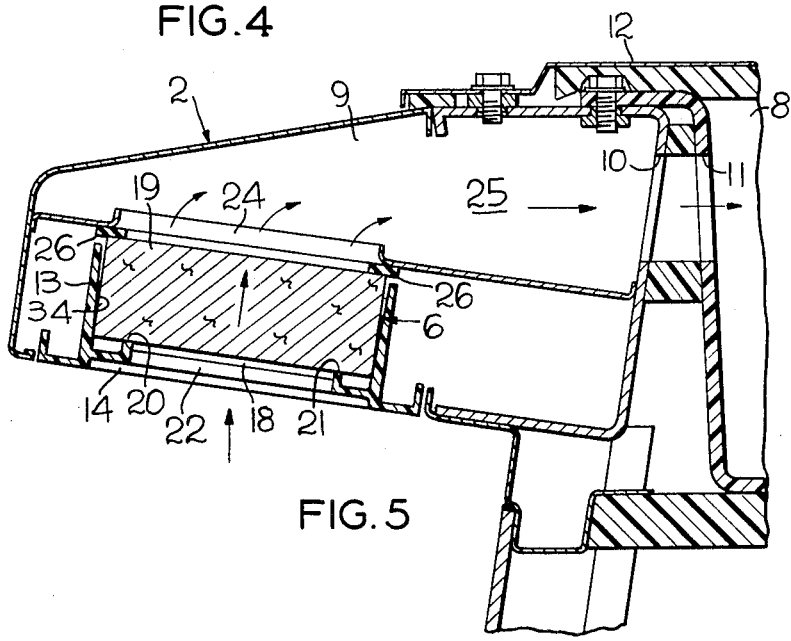
FIG. 5 is a cross section view taken along line V—V of FIG. 2.

Incoming air flows through the filters 6 and 7 through openings in the side of the vehicle cab and rearwardly through an air chamber 8. From the air chamber 8 it flows through the air conditioning unit and then into the cab as shown to provide air conditioning. FIG. 5 shows a section view of the incoming air as it passes through the filter 6 through the air passage 9 and the lateral openings 10 and 11 on the side of the cab into the air chamber 8. The roof extension 2 extends from the roof panel 12 to the top of the cab. The roof extension 2 operates as a sun shade on the side of the cab. A tray 13 is shown in FIGS. 6, 7 and 8. The grill work 14 is shown on the underside of the tray generally conforming to the underside of the roof overhang 2 as viewed in FIG. 1. The latch 15 selectively latches the tray 13 in its operating position. The opposite end of the tray is carried by two pivot pins 16 and 17 which pivotally support this end of the tray. The total surface of the grill work 14 is not used to allow passage of air. Only the grill work 18, as shown in FIG. 6, is used underneath the filter element which is not shown in this view. The tray above the grill work 18 receives the filter as shown in FIG. 5. The filter element 19 bears against the sealing edges 20 and 21 to form a seal in the inlet opening 22. The filter element 19 is also pressed up against the seal ring 26 around the passage 24 in the air chamber 25. The tray 13 is pressed upwardly and the latch 15 is latched. The surfaces of the seal 26 and the sealing edges 20 and 21 form a seal on the filter element 19.

Figure 4:
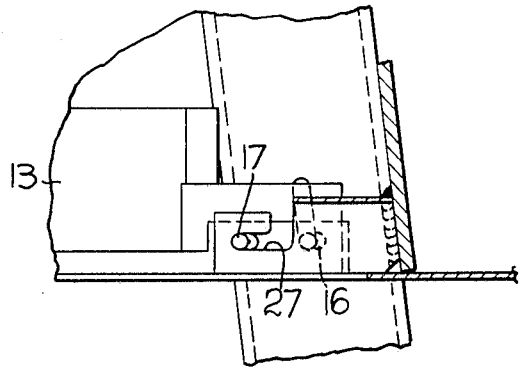
FIG. 4 is a cross section view taken along line IV—IV of FIG. 1.

FIG. 4 shows the notch 27 which carries the pivot pin 17. The pivot pin 17 can be removed from the notch 27 by rear and upward movement of the tray 13.

Figure 3:
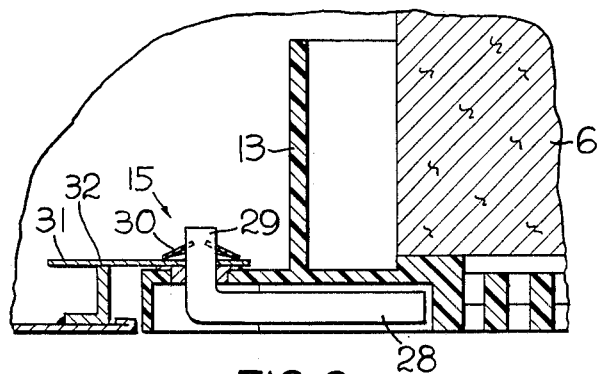
FIG. 3 is a cross section view taken along line III—III of FIG. 1.

FIG. 3 illustrates the latch 15. The latch consists essentially of a handle 28 having a pivotal end 29 carrying the belleville washer 30. The washer 30 bears against the latch element 31 and in the latched position element 31 bears against the edge 32 to carry the end of the tray and the filter element 13.

The filter operates in the following described manner.

Referring to FIG. 5, the filter element 19 is in the operating position in which the sealing edges 20 and 21 bear against the filter element 19 on the underside while the seal ring 26 bears against the upper surface of the filter element. The filter element is sealed in this position and the inlet air comes through the inlet port 22, passage 24 and chamber 9 through the ports 10 and 11 to the air conditioning system.

Figure 2:
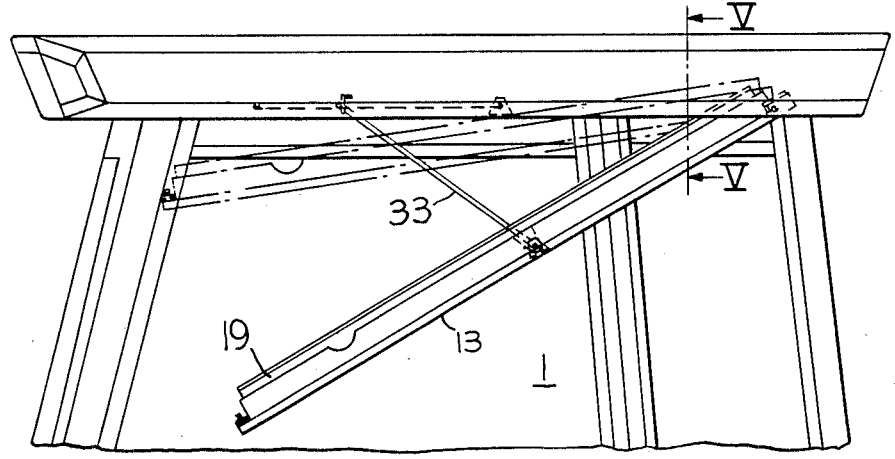
FIG. 2 is a side elevation view showing the filter in the downwardly pivoted position for servicing of the filter element.

When it is desired to remove the filter element 19, the latch 15 is rotated allowing the latch element 31 to release the latch and permit the tray 13 to pivot downwardly as shown in FIG. 2. The link 33 holds the tray in a servicing position as shown in FIG. 2 so the filter element 19 can be removed from the tray. If the filter chamber 34 and the tray 13 are relatively clean, a new filter element 19 can be inserted in the tray 13 and the tray is pivoted upwardly and relatched in its operating position by the latch 15. If, however, when the filter element 19 is removed, the filter chamber and tray 13 are not clean, the tray 13 can be removed by rear and upward movement in the notch and a mating slot on the opposite side of the tray. In this manner, the tray can be cleaned as well as the filter chamber and a filter element and tray rinsed out and pivoted upwardly and latched in position by the latch 15. Pivoting the tray downwardly and allowing the dirt to fall free from the filter chamber and the filter tray avoids the necessity of cleaning in the cab as formerly was required.

The embodiments of the invention in which an exclusive property or privilege is claimed are defined as follows:

1. A vehicle cab having filtering means comprising, a side wall on the side of said cab, a lateral roof overhang extending beyond said side wall and defining a filter chamber, means defining an air inlet passage and an air outlet passage from said filter chamber with passage means extending to an air ventilating system, a filter tray, a filter element in said tray, means providing a seal with said filter element at the inlet passage and the outlet passage of said filter chamber when said filter tray is in the operating position, means defining a filter servicing opening externally of said cab in said roof overhang for pivoting said tray through said servicing opening, pivotal support means pivotally supporting one end of said filter tray, a latch releasably holding the other end of said filter tray in the operating position and for releasing said tray for servicing of said filter element from the outside of said cab.

2. A vehicle cab having filtering means as set forth in claim 1 wherein said sealing means at the outlet passage from said filter chamber defines a sealing ring to provide a seal with said filter element.

3. A vehicle cab having filtering means as set forth in claim 1 wherein said sealing means of the inlet passage includes sealing ridges on said tray bearing against the underside of said filter element when said filter tray is latched in the operating position.

4. A vehicle cab having filtering means as set forth in claim 1 wherein said tray defines a grille on the exterior side of said filter element for supporting the filter element in its operating position.

5. A vehicle cab having filtering means as set forth in claim 1 wherein said pivotal support means includes detachable pivotal support elements on said filter tray to allow removal of said tray from its pivotal support position.

6. A vehicle cab having filtering means as set forth in claim 1 including, a link pivotally and slideably connected to said tray and said roof overhang to provide a stationary pivoted servicing position downwardly from the operating position of said filter tray for replacement of said filter.

7. A vehicle cab having filtering means as set forth in claim 1 including means mounting said filter on the underside of said roof overhang and including said means defining said servicing opening.

8. A vehicle cab having filtering means as set forth in claim 1 including, means defining an air inlet on the underside of said roof overhang, a passage means extending from said filter element to a lateral opening in said cab for transmitting filtered air to the air ventilating system.

9. A vehicle cab having filtering means as set forth in claim 1, wherein said tray defines a filter element compartment for receiving a replaceable filter element.

10. A vehicle cab having filtering means as set forth in claim 1 including means defining an inlet opening on the underside of said roof overhang a filter on each side of said cab to provide filtered air from both sides of said vehicle cab.

* * * * *